United States Patent [19]

Rialan et al.

[11] Patent Number: 4,712,199

[45] Date of Patent: Dec. 8, 1987

[54] PROCESS FOR CONTROLLING THE STORAGE OF DATA RECEIVED BY A SEISMIC RECORDING SYSTEM AND A DEVICE FOR IMPLEMENTING SAME

[75] Inventors: Joseph Rialan, Meudon; Renate Bary, Rueil-Malmaison, both of France

[73] Assignee: Institut Francais du Petrole, Rueil-Malmaison, France

[21] Appl. No.: 801,764

[22] Filed: Nov. 26, 1985

[30] Foreign Application Priority Data

Nov. 30, 1984 [FR] France ............................. 84 18424

[51] Int. Cl.⁴ ......................... G01V 1/0; G06K 5/00
[52] U.S. Cl. ....................... 367/76; 367/77; 364/421
[58] Field of Search ............ 367/76, 79, 77, 50, 367/51, 55, 60; 364/421; 375/34, 58; 340/825.3; 371/47

[56] References Cited

U.S. PATENT DOCUMENTS

| | | | |
|---|---|---|---|
| 2,739,301 | 3/1956 | Greenfield | 340/870.13 |
| 3,473,150 | 10/1969 | McClelland | 371/32 X |
| 3,569,934 | 3/1971 | Parr, Jr. | 367/79 X |
| 3,618,000 | 11/1971 | Carruth, Jr. | 367/79 |
| 3,806,864 | 4/1974 | Broading et al. | 367/77 |
| 3,990,036 | 11/1976 | Savit | 367/74 X |
| 4,112,412 | 9/1978 | Howlett | 367/79 |
| 4,117,448 | 9/1978 | Siems | 367/79 |
| 4,320,472 | 3/1982 | Fort | 367/76 X |

*Primary Examiner*—Thomas H. Tarcza
*Assistant Examiner*—Tod R. Swann
*Attorney, Agent, or Firm*—Antonelli, Terry & Wands

[57] ABSTRACT

A process is provided for controlling the storage in a recording system of signal samples received successively over a transmission channel. The series of samples to be transmitted are subdivided into blocks comprising a given number of samples and each being provided with a digital timing word and a digital word containing the number of the block. Control units are used for detecting these two words and checking that the number of samples received is conformable and for controlling the access of the data received to the memory.

8 Claims, 6 Drawing Figures

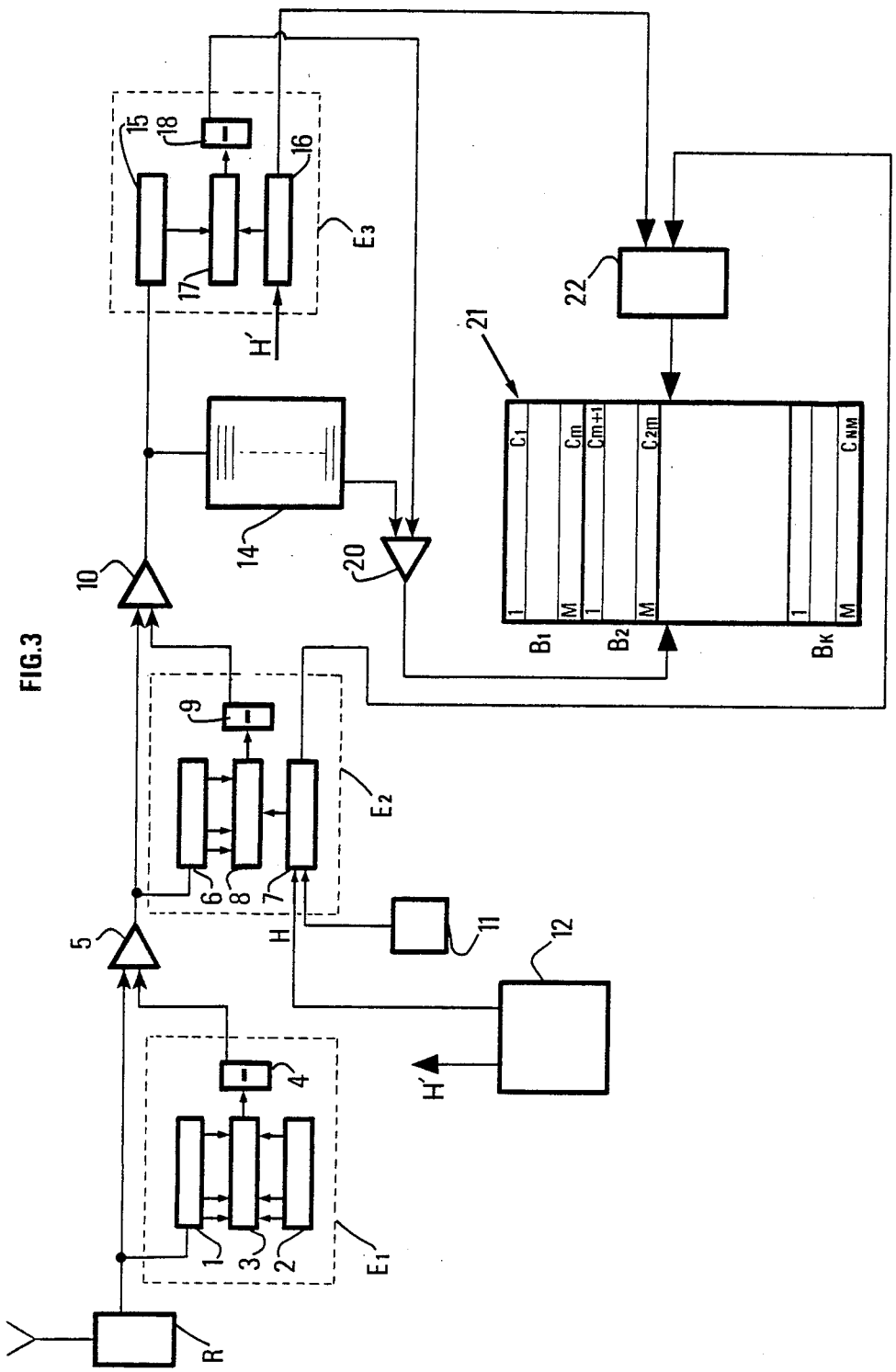

PROCESS FOR CONTROLLING THE STORAGE OF DATA RECEIVED BY A SEISMIC RECORDING SYSTEM AND A DEVICE FOR IMPLEMENTING SAME

BACKGROUND OF THE INVENTION

1. Field of the Invention

The invention relates to a process for controlling the storage of data received by a seismic recording system and a device for implementing same.

More particularly, the process of the invention applies to the recording of seismic signals transmitted from a plurality of reception assemblies spaced apart along a seismic profile, in the form of series of digitized samples centralized in a recording and processing laboratory.

2. Description of the Prior Art

Such reception assemblies are generally formed from acquisition devices adapted for sampling the signals picked up by one or more seismic sensors, in response to echoes from subterranean layers of seismic waves emitted in the ground, for digitizing these signals and storing them. When the acquisition of these seismic signals is finished, the whole of the digital samples stored by each of the acquisition devices is transmitted to the central laboratory. The transmission may be provided either by a RF wave link or by a common cable connecting the acquisition devices in parallel.

On reception of specific control signals sent from the laboratory, each device proceeds with transmitting the data it has acquired by radio wave link or else by connecting itself to the common cable. Such an assembly is described for example in the French Pat. No. 2 511 772 or the French Pat. No. 2 538 561.

Each acquisition device causes the transmission of the data it has memorized to be preceded by identification signals. The transmission of the data may therefore be complete or split up. In the first case, all the digital words of the series are transmitted in the form of a chain. In the second case, the whole of the samples is divided into groups of samples transmitted in the form of a chain and synchronization words are transmitted between any two successive groups. When the quality of the connection is not perfect, transmission errors occur. Some digital words or groups of digital words are not transmitted or else are truncated or made indetectable because parasitic signals are superimposed on seismic data on the cable or the radio wave link. When the transmission of the series is finished, it is always possible to check whether the number of samples centralized in a storage in the central laboratory corresponds to the number of samples which were transmitted but, should a certain part thereof be missing because of transmission faults, it is impossible to know accurately at what moment the errors occurred. With the samples stored in the memory in the order of arrival thereof, some of them which did not follow each other in the transmitted series find themselves juxtaposed in the memory because some data is missing and the times in the sequence when such "packing" occurred cannot be determined.

SUMMARY OF THE INVENTION

The process of the invention overcomes the above mentioned drawbacks. It comprises the subdivision of each series of transmitted samples into a plurality of blocks each containing the same number of samples, each of these blocks being separated from the others by synchronization signals and provided with identification signals defining its order number in each series, the successive controls of the synchronization signals and of the identification signals associated with each block and the transfer of each of the blocks recognized conformable by the control, to positions on a recording medium assigned previously to this block.

The control may also comprise the counting of the number of samples in each group received and validation of the blocks of samples received whose number is at least equal to a determined threshold value.

The recognition operations carried out on the synchronization and identification signals at the head of each block and the possible checking of the number of samples in each block received, allows the stored data to be stored in good order. The memory positions which were assigned beforehand to certain data are left free if this data does not reach the recording system, following transmission errors. Since the exact timing of the reception steps is respected, the seismic data may be reconstituted accurately from the stored samples, which improves the readability of the seismic sections obtained.

BRIEF DESCRIPTION OF THE DRAWINGS

Other features and advantages of the process of the invention will appear from reading the following description of a particular embodiment of a device for implementing same, given by way of nonlimitative example with reference to the accompanying drawings in which:

FIG. 3 shows schematically a first embodiment of the device for implementing the process, for checking the blocks of samples received, before recording thereof.

DESCRIPTION OF THE PREFERRED EMBODIMENTS

Figure 1:
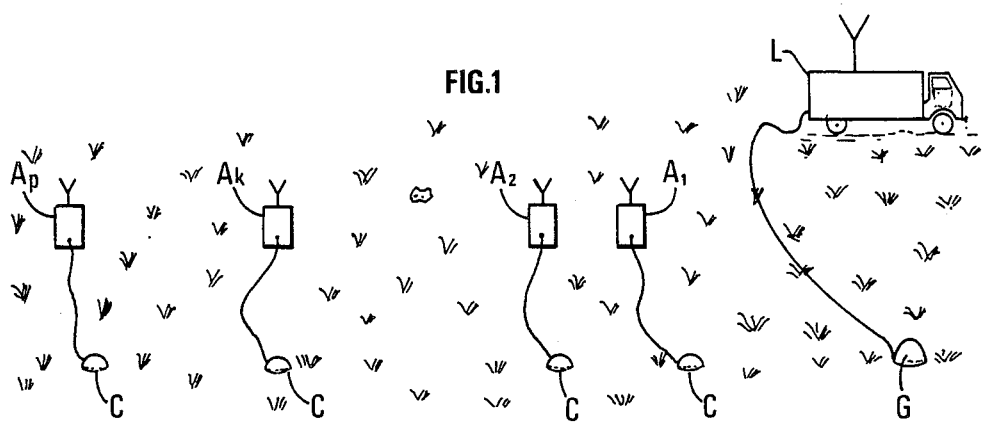
FIG. 1 shows schematically a seismic prospection system disposed along a seismic profile to be explored.

A seismic prospection system comprises (FIG. 1) a plurality of seismic sensors C spaced apart along a profile to be explored, an assembly of devices or boxes $A_1, A_2, \ldots A_k \ldots A_p$ for the acquisition of the signals received by the seismic sensors, in response to the echoes from the subterranean layers of acoustic waves emitted in the ground by a seismic source G and a central laboratory L comprising a recording system and an assembly for conducting the prospection operations. This system is adapted for triggering the seismic source G, controlling the acquisition by the different devices $A_1, A_2 \ldots A_k \ldots A_p$ of the signals received by the sensors C and, after the reception step, coordinating the sequential transfer of the data from the different acquisition devices to the recording system.

The transfer takes place over a RF wave link for example.

The seismic data transmitted from each of the acquisition devices is in the form of a series of digital "words" corresponding to samples taken successively from the signals received by the sensors C and digitized.

In application of the process of the invention, the different acquisition devices $A_1, A_2 \ldots A_k \ldots A_p$ are adapted for subdividing each series of digital words into a plurality of blocks $B_i, B_{i+1}$ etc. (FIG. 2) each containing the same number M of digital words $e_1, e_2 \ldots e_M$ of an identical format and associating with each of these blocks a synchronizing word $S_y$ and a word n (i),n(i+1) etc., defining its order number within the series. The time for transmitting a block comprising n samples and the two words $S_i$ and n is given by the relationship:

$$T = (M+2)p$$

where $\tau$ designates the time for transmitting a sample.

Any acquisition device $A_1$ to $A_p$ having received the transmission order which concerns it, connects itself to the transmission channel used for transmitting the series of digitized words which it has stored, in the form defined above.

The synchronization word $S_y$ allows the separation between two consecutively received blocks to be detected and the time of arrival of each of them to be determined. The block number contained in the digital word n(i), n(i+1) which follows immediately after the synchronization word is used for controlling the storage of the samples at the positions provided on the recording medium.

The purpose of the device of the invention described hereafter is to validate the blocks of samples received and, after validation, to conduct the storage operations.

It comprises (FIG. 3) a first control unit $E_1$ comprising a first register 1, a second register 2 and a comparator 3 adapted for containing the digital words received and a bistable flip-flop 4. An assembly R for receiving the series of digital words to be recorded is connected to the input of register 1 and to the input of a first control gate 5. The control input thereof is connected to an output of flip-flop 4. The register 2 contains a digital word identical to the synchronization words $S_y$ to be recognized. The comparator 3 is connected to the parallel outputs of registers 1 and 2 and, when it detects an identity between the contents of the two registers, it actuates flip-flop 4 which opens the first control gate 5.

Figure 2:
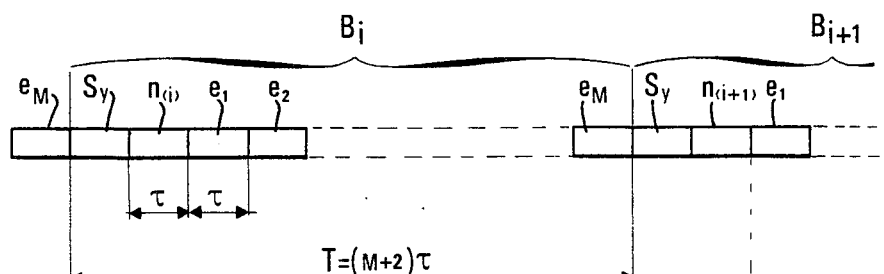
FIG. 2 shows schematically the structure of a block of samples of digital signals transmitted.

The device also comprises a second control unit $E_2$ comprising a register 6, a counter 7, comparator 8 and a bistable flip-flop 9 controlled by the comparator 8. The output of the control gate 5 is connected to the input of register 6 and to one input of a second control gate 10. The counting input of counter 7 receives a clock signal H delivered by a timing element 11. An element 12, connected to the control inputs of the counter 7, allows its maximum capacity to be selected and to make it equal to the number M of blocks of samples in the series to be recorded. The period of signal H is adapted to the period of reception of the successive sample blocks, so that the counter 7 is incremented by 1 at the beginning of every new period T (FIG. 2). When the comparator detects an identity between a word introduced into register 6 and the number set in counter 7, it actuates the flip flop 9. The output of this latter is connected to the control input of gate 10.

The output of gate 10 is connected on the one hand to a buffer memory 14 adapted for containing at least the digital words of the same block and, on the other hand, to the input of a third control unit $E_3$.

Figure 4:
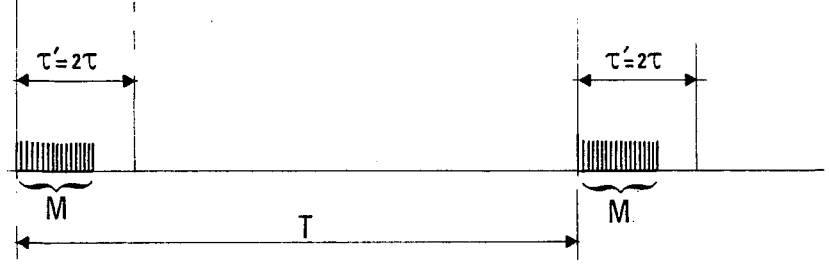
FIG. 4 shows the timing diagram of pulses generated by a timing element of the device.

This latter comprises a first and second counter 15, 16, a comparator 17 connected to the two counters 15, 16 and a bistable flip-flop 18 actuated by the comparator 17. The input of counter 16 receives from the element 12 a clock signal H' formed of M pulses (M being the number of words in each block) generated at the beginning of each period T, before reception of the successive samples $e_1$ to $e_M$ (FIG. 4).

One output of flip-flop 18 is connected to an input of an AND gate 20, a second input of this latter being connected to the output of the buffer memory 14. The output of the AND gate 20 is connected to the data input of a storage assembly 21. An address register 22 is associated with assembly 21 for controlling the access of the data to the positions therein. The control inputs of register 22 are connected respectively to the "carry" outputs of counters 7 and 16.

The first control unit $E_1$ is adapted for detecting the successive synchronization words $S_y$ transmitted at the head of the blocks of samples by comparing the successive words passing through register 1 with a word identical to the words $S_y$, introduced into register 2. The second control unit $E_2$ is adapted for detecting the order number of each block of samples received and checking that the blocks in the same series are in fact received in order. The third control unit is adapted for checking that each block received in fact comprises the expected number of samples and for validating storage thereof.

The device operates in the following way: with the transmission of a series triggered off, the successive words of this series travel through register 1 of the first control unit $E_1$. When comparator 3 detects the passage of a synchronization word $S_y$ by comparison with the word contained in register 2, it orders activation of flip-flop 4, which controls the opening of the control gate 5. The words following the recognized synchronization word $S_y$ then have access to the second control unit $E_2$.

Similarly, this latter compares the digital word passing through register 6 and the digital word representing the number of the expected sample block. With a number i of blocks already received and the reference counter 7 incremented by 1 by the timing element 11, at the beginning of the period T of reception of block $B_{i+1}$, detection by the compartor 8 of the identification number of this block causes activation of the flip-flop 9 and, consequently, opening of the AND gate 10.

The opening of the AND gate 10 allows the successive samples $E_1, E_2 \ldots E_M$ to have access to the counter 15 of the third control unit and to the buffer memory 14 where they are stored. With counter 16 incremented at the beginning of the period T (FIG. 4) by the signal H' from the element 12, to a value M, the comparator 17 checks that the number of samples counted in fact corresponds to this value and in this case initiates the flip-flop 18. Opening of gate 20 allows the samples of the block received to be transferred from the buffer memory 14 to the positions in the storage assembly 21 designated successively by element 22.

Incrementation of the addressing element 22 is provided, on the one hand, by pulses from the counter 16 when this latter, at the beginning of the following reception period T receives the signal H' (FIG. 4) and, on the other hand, by the pulses of period T produced by the counter 7 whenever it is incremented. Said pulses of period T control the recording of any new block in a different section of the storage element 21. The pulses from counter 16 control the storage of the samples of the same block at the different positions of the same section of element 21. The recognition operation carried out on the words $S_y$ and $n(i)$ at the head of each block and checking of the number of samples of each block received allows the stored data to be stored in good order.

The embodiment of FIG. 3 is particularly well adapted to a high flow transmission system.

Figure 5:
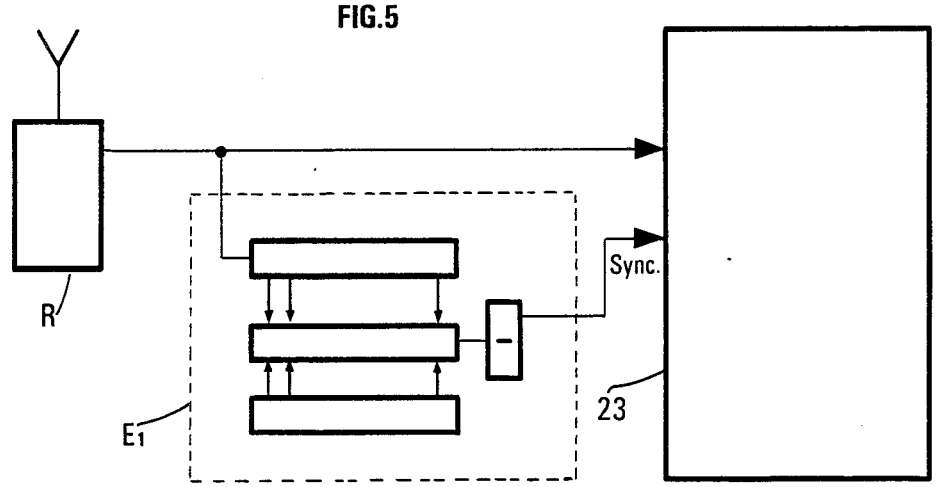
FIG. 5 shows schematically a second embodiment of the device implementing the process including a computer.

In the embodiment shown in FIG. 5, the reception assembly R transmits the digital words received successively to a programmable processor 23 and to a unit $E_1$ similar to unit $E_1$ of the device of FIG. 4 which recognizes, among the words of each series, the timing word preceding each of the successive blocks of samples and, at each detection, transmits a detection signal SYNC to the processor 23.

Figure 6:
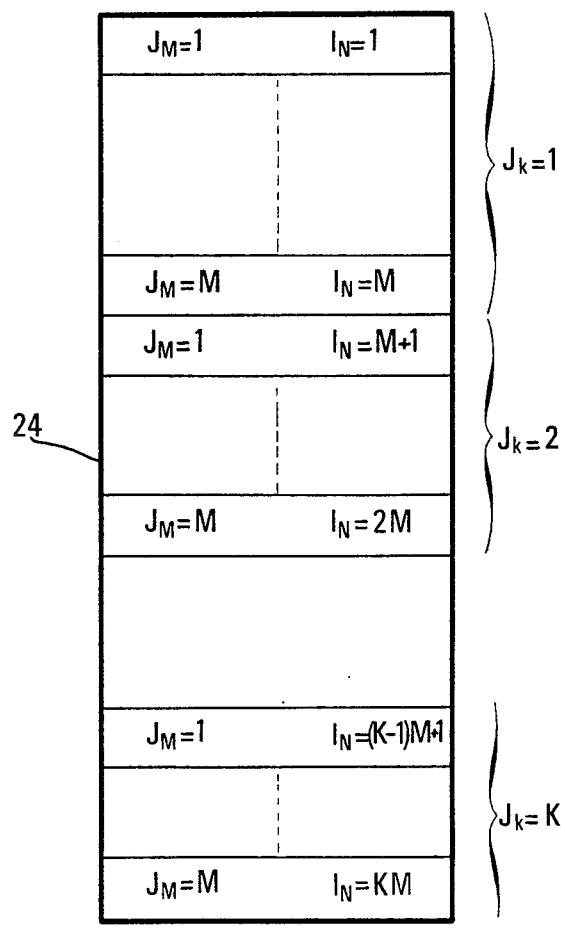
FIG. 6 shows a memory in which the samples received are successively stored.

The processor 23 is adapted for carrying out a set of validation tests on the successive words received and the detection signal generated by unit $E_1$ for checking that the blocks are conformable, before ordering storage thereof at their respective positions in an internal memory 24 shown in FIG. 6 in the form of a table.

Processor 23 carries out its tests in accordance with the following flow chart which translates into instructions the steps of the process of the invention. The different signals and indices in this flow chart are as follows:

SYNC: recognition signals generated by the assembly $E_1$,

SYNCHRO: timing words received,

N: number of words in the series of samples to be received, $I_N$: index designating the successive addresses in the memory, M: number of samples in each block, $J_M$: index designating successively the samples in each block, K: number of blocks of M samples to be received, $J_K$: index designating the successive blocks, and $I_K$: number of the block received.

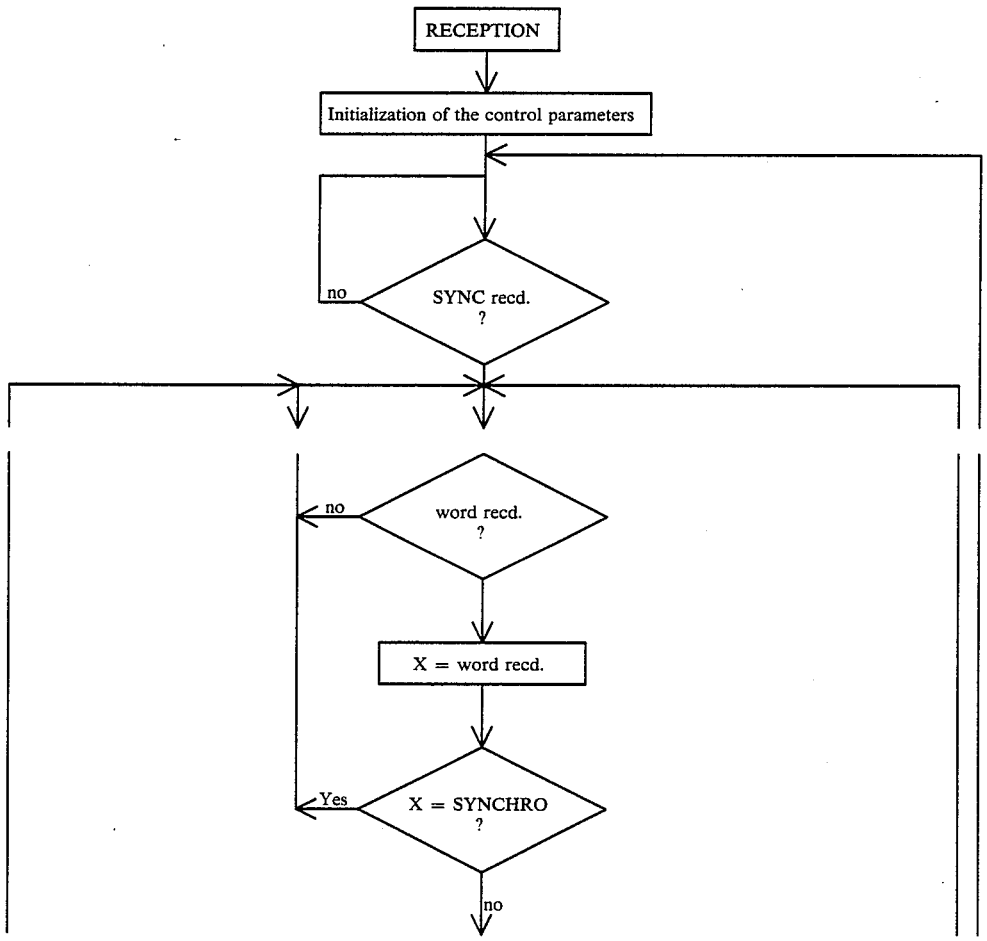

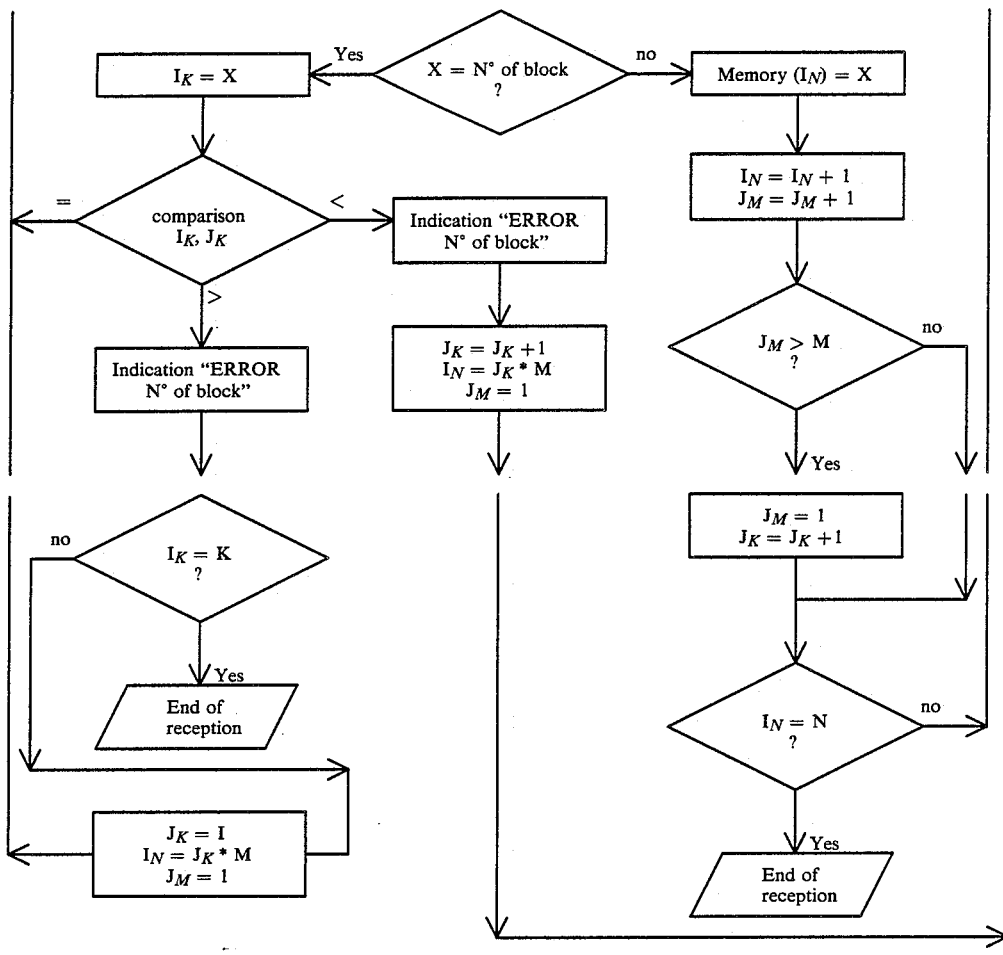

What is claimed is:

1. A process for controlling storage by a recording system of signals derived from seismic signals emanating from subterranean discontinuities in response to waves generated by a seismic source, said seismic signals being received by sensors, and signals produced by said sensors being collected by a plurality of acquisition devices which operate to sample, digitize and store received signals in the form of a series of samples, each series of samples concerning the same signal and being associated with control signals for detection of possible transmission errors, the different series of samples stored respectively by the different acquisition devices being transmitted sequentially to the recording system, said process comprising:

subdividing each series of samples to be transmitted from an acquisition device into a plurality of blocks each containing an arbitrary number of samples which is the same for all the series, and forming a signal train for transmission in which each one of said blocks is separated from the other blocks by a timing signal and is provided with an identification signal defining its order number in the signal train;

transmitting a signal train from an acquisition device to said recording system;

first checking in said recording system for detection of the successive timing signals heading each block of a received signal train;

second checking in said recording system for detection of an identification signal associated with each block for which a timing signal has been detected to determine if a correct block has been received;

third checking in said recording system the number of samples in each received block for which the identification signal indicates that a correct block has been received;

validating blocks comprising a number of received samles greater that a given value as determined in said third checking; and transferring each of the validated blocks to a position of a recording medium previously assigned to said block, whereby seismic traces corresponding respectively to the transmitted series can be plotted, respecting exact timing of reception.

2. A process as claimed in claim 1, wherein said second checking operation includes generating a block number signal, increment said block number signal successively at a timing corresponding to the interval between blocks in a received signal train and comparing said block number signals to identification signals associated with each block in the received signal train to determine if the block as received is in the correct order.

3. A device for controlling storage by a recording system of signals derived from seismic signals emanating from subterranean discontinuities in response to waves generated by a seismic source, said seismic signals being received by sensors, and signals produced by said sensors being collected by a plurality of acquisition devices which operate to sample, digitize and store received signals in the form of a series of samples, each series of samples concerning the same signal and being associated with control signals for detection of possible transmission errors, the different series of samples stored respectively by the different acquisition devices being transmitted sequentially through a radio link to the recording system, and each series of samples being subdivided into a plurality of blocks each containing an arbitrary number of samples which is the same for all the series and being separated from the other blocks by timing signals and being provided with an identification signal defining its order number in each series, said device comprising:

a first unit connected to a radio receiver and including means for detecting in each block received the timing signals and for controlling access of the blocks provided with timing signals to a second unit for recognizing the order number of each block of samples on the basis of the identification signal received therewith and controlling transfer of the blocks provided with a correct order number into a buffer memory; and a third unit connected to receive blocks of samples from said second unit for counting the number of samples in each block transferred into the buffer memory, said third unit including means for controlling the transfer of the samples from the buffer memory to predetermined addresses of a recording medium when the number of samples in the received block is greater than a predetermined value.

4. A device for controlling storage by a recording system of signals derived from seismic signals emanating from subterranean discontinuities in response to waves generated by a seismic source, said seismic signals being received by sensors, and signals produced by said sensors being collected by a plurality of acquisition devices which operate to sample, digitize and store received signals in the form of a series of samples, each series of samples concerning the same signal and being associated with control signals for detection of possible transmission errors, the different series of samples stored respectively by the different acquisition devices being transmitted sequentially by a radio link to the recording system, and each series of samples being subdivided into a plurality of blocks each containing an arbitrary number of samples which is the same for all the series and being separated from the other blocks by timing signals and being provided with identification signals defining its order number in each series, said device comprising:

a first unit connected to a radio receiver and including means for detecting in each block received the timing signals, means for controlling access of the blocks provided with timing signals to a computing unit for validating blocks by detection in each block of a correct order number identification signal, means for counting the number of samples of validated blocks, and means for controlling storage of those validated blocks having at least a predetermined number of samples at predetermined positions in a recording means.

5. A device for controlling storage by a recording system of signals derived from seismic signals emanating from subterranean discontinuities in response to waves generated by a seismic source, said seismic signals being received by sensors, and signals produced by said sensors being collected by a plurality of acquisition devices which operate to sample, digitize and store received signals in the form of series of samples, each series of samples concerning the same signal and being associated with control signals for detection of possible transmission errors, the different series of samples stored respectively by the different acquisition devices being transmitted sequentially through a radio link to the recording system, and each series of samples being subdivided into a plurality of blocks each containing an arbitrary number of samples which is the same for all the series and being separated from the other blocks by timing signals and being provided with identification signals defining its order number in each series, said device comprising:

a first recognition unit connected to a radio receiver and including means for detecting in each block received in the timing signals and for controlling access of the blocks provided with timing signals to a second recognition unit for recognizing the order number of each block of samples on the basis of the identification signal received therewith and controlling transfer of the blocks provided with a correct order number into a buffer memory, said first and second recognition units each comprising a register connected to receive the successive signals of each series, means for storing a reference value, means for comparing the signals in said register with the reference value contained in said storing mean and a bistable flip-flop controlled by said comparing means for generating a validation signal when comparison is detected by said comparing means; and a third recognition unit for counting the number of samples in each block transferred into the buffer memory and for controlling the transfer of the samples from the buffer memory to predetermined addresses of a recording medium when the number of samples in the received block is greater than a predetermined value.

6. A device as claimed in claim 5, wherein said storing means of said first recognition unit is a register containing a digital word corresponding to the timing signals transmitted with said blocks.

7. A device as claimed in claim 5, wherein said storing means of said second recognition unit comprises a counter connected to a clock element for delivering incrementing signals whose period is equal to the time interval for receiving a block of samples.

8. A device as claimed in claim 6, wherein said third recognition unit comprises a first counter incremented by the successive samples of each block received, a second counter connected to a clock device for delivering incrementing signals in a number equal to the samples in each block, at the beginning of the reception of each block, and a comparator associated with a bistable flip-flop for controlling the transfer of the samples contained in the buffer memory to said recording medium.

* * * * *